Feb. 3, 1942.   G. F. COLLEY   2,271,680
COMBINATION TOOL
Filed April 29, 1940
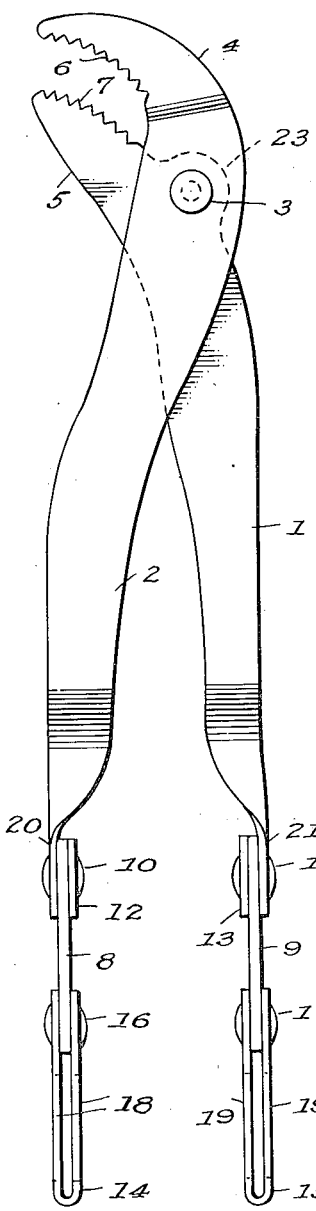
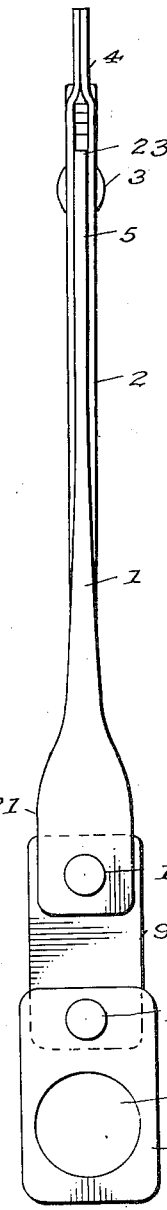
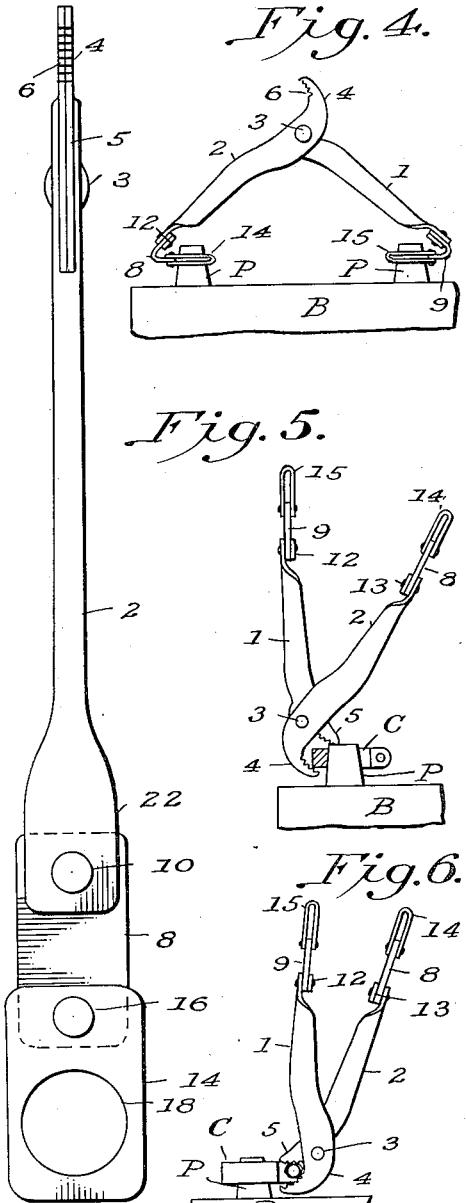
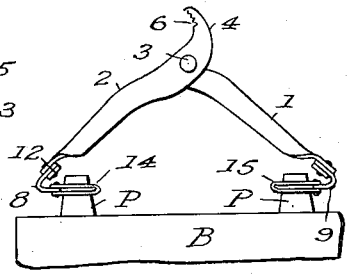
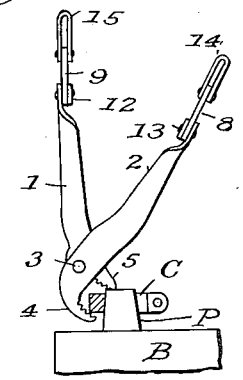
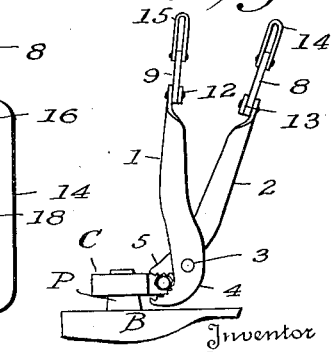
Inventor
GEORGE F. COLLEY
By Edward B. Beale
Attorney Patented Feb. 3, 1942

2,271,680

UNITED STATES PATENT OFFICE 2,271,680

COMBINATION TOOL

George F. Colley, Augusta, Ga., assignor to The Battery Tool Corporation, Augusta, Ga., a corporation of Georgia Application April 29, 1940, Serial No. 332,376

4 Claims. (Cl. 294—92)

My invention relates to a combination tool and carrier and especially to a tool adapted to form the important manipulative functions necessary in servicing and handling storage batteries and the like. More particularly, my invention relates to a combination tool and carrier adapted for handling and servicing storage batteries of the types which are used in connection with internal combustion engines such as automotive vehicles.

The storage batteries largely used in automotive vehicles are conventionally rectangular in shape and provided on the top thereof with fixed upstanding terminal or binder posts. Generally, such posts are cylindrical, or in the form of a truncated cone, and protrude from the top surface of the battery in such a manner as to insure completion of the necessary electrical circuit of the battery and to permit the attachment thereto of suitable terminal clips which are in turn connected to cables, i. e. conductors. Customarily, the battery posts or terminals are formed of lead or a similar conducting alloy and the terminal clips are likewise formed of a metal or alloy shaped to permit encirclement of the battery posts or terminals and to insure contact with the surfaces thereof; and are provided with suitable nut and bolt assemblies or their functional equivalents for tightening the terminal clips and making them fast to the battery posts or terminals when the battery is in operative hook-up. Suitable precautions are taken, by way of arrangement of the battery posts and terminals and their attendant clips, and through the use of insulating material, to prevent short-circuiting of the battery.

Because the battery posts and clips are made of relatively soft metals such as lead or suitable conducting alloys and further because the fluid contents of the battery are frequently highly acidic, there is a tendency toward corrosion or at least oxidation of the metals comprising the battery posts or terminals and their attendant clips as well as the nut and bolt assembly or its equivalent used to maintain the clip in fixed position on the battery terminal. Furthermore, there is a tendency on the part of the contacting surfaces of the battery posts and their attendant clips to stick and resist disengagement when, for any reason such as recharging the battery, it is desired to remove the terminal clips and move the battery from its operative position to some other place. The relative softness of the materials tends to enhance this sticking as well as the fact that the contact between the battery terminal clips and the battery terminals is to a certain extent a frictional contact. Frequently, considerable difficulty is experienced in removing the terminal clips from the battery terminals or posts. This difficulty is enhanced when corrosion or oxidation of the metallic parts has taken place. Furthermore, since the plates in the battery are of lead and since the battery must be sturdily made to withstand shocks and jars attendant upon travel over all kinds of highways, in the case of automotive vehicles, the storage batteries are quite heavy and quite difficult to remove for servicing or recharging.

Various types of carriers have been proposed for engagement with the battery terminals or posts to permit the lifting of the battery from its normal position and carrying it to some other place. Such carriers, while useful in their restricted field, are not useful in aiding the disengagement of the terminal clips from the battery terminals. Moreover, various types of tools have been proposed for functioning as pliers in removing the terminal clips from the battery terminals or posts. Such tools, while useful in their particular field, cannot be used in lifting the battery from its operative position and carrying it elsewhere. One of the disadvantages which attends the use of such tools is the real danger of short-circuiting the battery terminal posts to the detriment of the battery, not to mention the injury to the operator resulting from quite severe shock.

In an earlier patent granted to me July 21, 1931, Patent No. 1,815,665, I have disclosed a combination tool adapted as a carrier or lifting device for a battery and as a pair of pliers or the like useful in engaging or disengaging the nut and bolt assembly of the battery terminal clips. I have proposed in the device illustrated in my aforesaid patent, the use of an insulated bushing designed to establish a non-conducting element between the arms of my patented combination tool and the carrier elements thereof. I have found that while this tool functions operatively in the manner taught in my aforesaid patent, there is nevertheless danger of short-circuiting the battery when my patented tool has been in hard use. This is because of the difficulty of obtaining a suitable insulated bushing which will retain its insulating properties while resisting the ravages of wear and friction attendant upon its use as a carrier.

An object of my present invention is to provide a combination tool and carrier adapted to provide firm engagement with battery posts when the tool is to be used as a carrier and at the same time avoid the danger of short-circuiting. A further object of my invention is to provide a combination tool and carrier which in one instrument will provide the serviceman or operator with means for performing the necessary operations for connecting or disconnecting the battery terminal clips and removing the battery for servicing or recharging without danger of short-circuiting and without having to resort to the use of a plurality of tools. A further object is to provide positive and reliable insulation between the main body of the tool and the carrier elements thereof so as to prevent short-circuiting of the battery.

My invention in one of its broad aspects comprises a combination tool and carrier in which a pair of crossed and pivotally connected levers are provided at one end thereof with plier-like jaws and at the other end thereof with suitable carrier elements designed to permit firm engagement with battery terminal posts or the like, yet which are insulated from the longer arms of the tool by means of a flexible non-conducting element.

One embodiment of my invention is shown by way of example in the drawing in which:

Figure 1 shows a side elevation of my combination tool in closed position;

Figure II is a plan view of the combination tool, in closed position, with the longer arm uppermost;

Figure III is a plan view of the combination tool, in closed position, with the shorter arm uppermost;

Figure IV shows the combination tool in extended position and as adapted for lifting and carrying a storage battery or the like;

Figure V shows the combination tool in position for disengaging a battery terminal clip from a storage battery post or the like;

Figure VI shows the combination tool in position for removing or tightening a nut, as on a storage battery terminal clip or the like.

Referring more particularly to the drawing and first to Figure I, the combination tool comprises a pair of crossed and pivotally connected levers 1, 2, one portion of each of which constitutes a handle member or arm. The arms 1 and 2 are pivoted upon and held in engagement by a suitable pin 3 which may be of the rivet type or a nut and bolt or the like. The arm 1 is extended beyond the pivot pin 3 to form a lower jaw 5, the upper surface of which may be serrated or knurled as shown at 7; the arm 2 is extended beyond the pivot pin 3 to form an upper jaw 4, the lower face of which may be serrated or knurled as shown at 6. The jaws 4 and 5 project laterally on the same side of the pivot 3 and in the same or substantially the same plane with each other, transversely of the pivot. It will be seen from the drawing that the head portions or jaws 4 and 5 are of different lengths and the jaw 4 extends somewhat beyond the jaw 5. The purpose of this arrangement will be described more in detail in connection with the description of the use of the jaws hereinafter.

Attached to the longer or lower ends of the levers or handles 1 and 2 are flexible, non-conducting elements 9 and 8 respectively. These elements 9 and 8 may be made of leather, rubber, fabric or any other material which is flexible and possesses sufficient tensile strength to permit its use in the manner intended while at the same time being a non-conductor or insulator. If fabric is used, I prefer to coat or impregnate the fabric with a rubber or latex composition, although obviously equivalent compositions, made from synthetic or natural rubber and non-conducting, flexible, film-forming plastics or resinous materials, may be used. The flexible non-conducting elements 8 and 9 may be connected to the extremities of the levers or handles 2 and 1 respectively by means of pins 10 and 11. These pins may be in the form of rivets or may be nut and bolt assemblies. To strengthen the connection, I prefer to use washers or stiffening plates 12 and 13. These may be of the same or different material from that of which the handles or levers are formed. To the lower extremity of the flexible non-conducting elements 8 and 9 respectively, I affix, by means of connecting pins 16, 17 which may be rivets or nuts and bolts or the like, carrier elements 14, 15. As shown in the drawing, these carrier elements are U-shaped with their upper arms embracing and in firm engagement with the flexible non-conducting elements 8 and 9 respectively. A suitable hole is drilled through each arm of the U-shaped element to provide openings 18, 19 therein for use in the manner hereinafter described.

In Figure II, I have shown a plan view of my combination tool and carrier as viewed from the top of the longer arm 2. In the embodiment shown, I have prepared the metal portions of my combined tool and carrier from metal stampings. This type of fabrication permits the relatively easy flaring of the lower portions of the handles 1 and 2 as shown at 21 and 20 respectively, so as to result in firmer and more secure attachment of the flexible non-conducting elements to the levers or handles. In this arrangement, I have also illustrated my combination tool and carrier as one in which the shorter arm 1 is inserted in a slot within the longer arm 2 before inserting the pivot pin 3. This permits the embracing of the shorter arm 1 by both segments of the longer arm 2, thereby resulting in an assembly in which lateral movement of the two pivoted arms is restricted. The shorter arm 1 is provided with a shoulder 23 to strengthen and secure the arm 1 in its pivoted relationship with pivot pin 3.

Figure III is a plan view of my combination tool and carrier in which the shorter arm 1 is uppermost. It will be noted that the jaw 4 extends slightly above and beyond the jaw 5 as shown in this figure.

Referring now to Figure IV which illustrates my combination tool and carrier in position for lifting and carrying a storage battery or the like, it will be seen that by extending the handles 1 and 2, the carrier elements 14 and 15 may be placed in position around battery terminal posts P, P of the battery B. The flexible non-conducting elements 8 and 9 are in flexed or partially folded position and function as insulators between the handles 1 and 2 and the carrier elements 14 and 15 which in turn are in contact with the battery posts P, P. Consequently, short-circuiting of the battery is avoided. When the serviceman or operator exerts an upward or lifting force on the handles of the tool, there is set in motion a vector force exerted in an upward direction (parallel to the axis of the battery terminal post), and outwardly in a direction at right angles to the said axis. As a result of this force, there is a tendency toward tilting the carrier elements 14 and 15 which serves to bind the carrier elements on the battery posts and enhance the frictional engagement therebetween. Consequently, the battery may be readily lifted and moved elsewhere.

One of the very distinct advantages arising from the use of flexible non-conducting elements between the carrier elements 14 and 15 and the handles 1 and 2 is the fact that my combination tool and carrier may be employed as a carrier with batteries of widely varying sizes. The flexibility of the non-conducting elements 8 and 9 enables the tool to function satisfactorily and efficiently with batteries in which the terminal posts are considerably farther apart than shown in the conventional battery B illustrated in Figure IV. Such multiple-plate, heavy duty batteries are frequently met in heavy duty trucks and the like. I contemplate, when necessary, using my combination tool in the manner generally illustrated in Figure IV of the drawing but differing from that illustrated view in that the carrier elements 14 and 15 may be rotated through an angle of approximately 180° and placed in position over the battery terminals outwardly instead of inwardly with respect to the ends of the handles 1 and 2. This manner of use is one which, in the light of this description, will become readily apparent to those skilled in the art. In addition, those skilled in the art will understand that the provision of the flexible non-conducting elements as connections between the carrier elements 14 and 15 and the handles 1 and 2 permits variation in the degree of extension of the handles 1 and 2; the flexibility of the elements 8 and 9 permits the use of the tool in connection with batteries having terminals or posts spaced apart at almost any distance within the range utilized by the manufacturers of storage batteries.

In Figure V, I have shown my combination tool and carrier in position for prying up and disengaging the terminal clip C from a battery terminal P on a conventional battery B. Frequently, in order to secure a storage battery in a relatively accessible yet safe place adjacent the framework of an automotive vehicle, the storage battery is placed in a compartment or basket under a seat or the like. Other parts of the framework of the vehicle prevent free access to the storage battery except from a direction immediately above it. Consequently, it is an advantage to have a tool which will permit the full use of its jaws when the handles of the tool are held in a substantially vertical plane. I have found that by extending the upper jaw 4 in the manner shown more in detail in Figure I of the drawing, better leverage is secured and corroded or oxidized battery terminal clips are much more readily removed than with conventional jaws. However, while I have shown these forms of coacting upper and lower jaws in my preferred embodiment illustrated in detail in Figure I, I do not wish to be restricted to any particular configuration of the jaws. It is sufficient, within the broad purview of my invention, if the coacting jaws operate both as pliers and a prier in the manner described herein.

In Figure VI of the drawing, I have shown my combination tool and carrier in position for tightening or untightening a nut or the like from the fastening means customarily encountered in connection with a battery terminal clip. It will be understood that in this figure, like reference numerals and characters refer to like parts illustrated in the other views of the drawing.

While I have illustrated my combination tool and carrier in a form in which I prefer to fabricate and assemble it, I do not wish to be restricted to the precise details illustrated in my drawing. Changes in detail as well as in the mode of fabrication are contemplated by me. For example, while I have shown my combination tool and carrier as made from metal stampings, it can of course be drop forged or made in any other suitable manner. Similarly, the carrier elements 14 and 15 have been illustrated as U-shaped, a form which I have found to give very satisfactory and reliable positive engagement when placed on a battery terminal post, for lifting the battery. I may, however, use carrier elements formed from a single perforated plate as well as any other type of element which will permit tilting and frictional engagement when placed around a battery terminal post.

The shape of the handles illustrated in Figure I of my drawing is of a form which lends itself very readily to stamping, as above stated. I appreciate that when my battery tool is used in the servicing of very heavy storage batteries, at times there may be a tendency toward creasing or pinching the hand of the operator when he grasps the extended handles and exerts an upward force in lifting a battery. For heavy duty service, I may provide relatively wider plates or flanges formed as part of or attached to the inner surface of the handles 1 and 2. Such plates may be welded to the handles 1 and 2 or alternatively may be made as part of the same stamping, being turned at right angles to and extending somewhat beyond the edges of the sides of the handles 1 and 2. The purpose of such plates or flanges would be to widen the bearing surface of the inside of the handles, as will be apparent to one skilled in the art.

My invention is not limited to the particular embodiments thereof illustrated and described herein, its scope being set forth in the following claims.

I claim:

1. In a combination storage battery tool and carrier having a pair of pivoted levers of which corresponding short ends of said levers are formed as coacting jaws and corresponding long ends of said levers are formed as handles, flattened portions associated with the free ends of said handles, the longitudinal plane of each of said flattened portions being substantially perpendicular to the longitudinal plane of said handles, a storage battery carrier plate associated with each of said handles and adapted to frictionally engage a battery terminal post, and a flexible non-conducting element connecting each carrier plate to a respective flattened portion to position said handles and said plates in spaced relation whereby each flexible element and its connected flattened handle portion and carrier plate are in co-planar relationship to one another.

2. A combination storage battery tool and carrier as set forth in claim 1 in which each of the opposing edges of the handles is provided with a wide flanged portion adjacent the pivotal point of said handles, said flanged portions extending beyond the same side of and at right angles to the longitudinal plane of the handles to form a supporting surface.

3. A combination storage battery tool and carrier as set forth in claim 1 in which each of the carrier plates comprises a U-shaped member, the respective legs of each of said plates being provided with co-axial perforations adapted to encircle and engage a battery terminal post.

4. A combination storage battery tool and carrier as set forth in claim 1 in which the flattened portions associated with the free ends of the handles consist of flared continuations of the ends of each of said handles.

His
GEORGE F. X COLLEY.
Mark

Witnesses to mark:
BEN E. PIERCE,
CLAUDINE ROWE.